United States Patent [19]

Hillman et al.

[11] 4,361,601
[45] Nov. 30, 1982

[54] METHOD OF FORMING A PERMIONIC MEMBRANE

[75] Inventors: Patrick E. Hillman; Preston S. White, both of Corpus Christi, Tex.

[73] Assignee: PPG Industries, Inc., Pittsburgh, Pa.

[21] Appl. No.: 207,592

[22] Filed: Nov. 17, 1980

[51] Int. Cl.$^3$ .............................................. B05D 5/12
[52] U.S. Cl. .................................... 427/123; 427/125; 427/126.1; 427/126.5; 427/180; 427/201; 427/367; 427/370; 427/371; 204/296
[58] Field of Search ..................... 156/279, 298, 308.6, 156/309.3; 429/33; 204/296; 427/180, 322, 123, 115, 367, 370, 371, 126.1, 126.3, 126.5, 125, 201

[56] References Cited

U.S. PATENT DOCUMENTS

| | | | |
|---|---|---|---|
| 2,793,136 | 5/1957 | Root | 427/180 |
| 3,134,697 | 5/1964 | Niedrach | 429/40 |
| 3,138,509 | 6/1964 | Cox | 156/308.6 |
| 3,156,608 | 11/1964 | Kamins | 156/308.6 |
| 3,180,782 | 4/1965 | Coates | 156/309.3 |
| 3,341,366 | 9/1967 | Hodgdon et al. | 429/33 |
| 3,917,499 | 11/1975 | Holden et al. | 156/308.6 |
| 4,206,022 | 6/1980 | Gunjima et al. | 204/296 |
| 4,224,121 | 9/1980 | Dempsey et al. | 204/98 |

OTHER PUBLICATIONS

W. S. Penn, "PVC Technology", McLaren and Sons, Ltd., London, (1961), pp. 48–93, Table 7.12.".

Primary Examiner—John D. Smith
Assistant Examiner—Richard Bueker
Attorney, Agent, or Firm—Richard M. Goldman

[57] ABSTRACT

Disclosed is a method of preparing a permionic membrane by contacting the permionic membrane with a plasticizer and an electroconductive material, and hot pressing the permionic membrane, the plasticizer, and the electroconductive material.

10 Claims, No Drawings

METHOD OF FORMING A PERMIONIC MEMBRANE

Permionic membrane, chlor-alkali cells, including both solid polymer electrolyte chlor-alkali cells and zero gap permionic membrane chlor alkali cells, have a cation selective permionic membrane separating the anolyte compartment, which contains an anode therein, from the catholyte compartment, which contains a cathode therein. In a zero gap permionic membrane electrolytic cell either the anodic electrocatalyst is removably in contact with the anodic surface of the permionic membrane or the cathodic electrocatalyst is removably in contact with the catholyte facing surface of the permionic membrane, but at least one of the anode electrocatalyst or cathodic electrocatalyst is removably in contact with the permionic membrane, and is neither bonded to nor embedded therein.

In a solid polymer electrolyte electrolytic cell either the anodic electrocatalyst or the cathodic electrocatalyst is bonded to and embedded in the permionic membrane and is not readily removably therefrom except by chemical or other degradation or destructive means. In a hybrid electrolytic cell one of the anode or cathode is in a zero gap configuration with the permionic membrane. That is, it is removable therefrom without destruction of the permionic membrane, while the opposite electrode is bonded to and embedded in the permionic membrane, in solid polymer electrolyte configuration therewith. That is, the opposite electrode is only removable therefrom by destruction or degradation of either the permionic membrane or the electrocatalyst or both.

In a typical solid polymer electrolyte electrolytic cell, the electrocatalyst is embedded in, and surrounded by hydrophobic material, e.g., sintered polytetrafluoroethylene, fluorinated ethylene propylene, or perfluoroalkoxy materials. The catalyst is typically in the form of particles embedded in this hydrophobic material.

It has now been found that a particularly advantageous method of fabricating a permionic membrane, for example, for use in a solid polymer electrolyte configuration, in a permionic membrane electrolytic cell configuration, or in a hybrid cell configuration may be provided by the use of a plasticizer. The plasticizer, especially in combination with the permionic membrane being in the thermoplastic form thereof, enhances the adhesion of current distributor particles or electrocatalyst particles to the permionic membrane, for example, during hot pressing thereof.

By a plasticizer is meant a high boiling material, which may be a liquid or solid, capable of converting a hard resin into a flexible and workable material. While not wishing to be bound by this explanation, it is believed that the individual polymeric molecules, i,.e., the macromolecules of the resin, are held together by strong Van der Waals forces. The plasticizer molecule inserts itself between the individual polymer macromolecules, weakening the Van der Waals forces, thus allowing the macromolecules to slip more easily past each other. In this way, the materials, i.e., current distribution conductors, or electrocatalyst materials, fit between individual polymers. It is believed that small amounts of plasticizer are held firmly by the resin, but that increasing plasticizer content causes the Van der Waals forces to become weaker such that the particles of inorganic material may be inserted between the individual macromolecules.

According to one exemplification of the invention herein contemplated, a plasticizer and a particulate conductor are present on the surface of the permionic membrane, and during hot pressing, the plasticizer allows the particles of the current distributor to enter into the resin matrix, i.e., between individual macromolecules, whereby to become adherent to the permionic membrane, that is, to become bonded to and embedded in the permionic membrane.

According to an alternative exemplification herein contemplated, it is believed that during hot pressing, the plasticizer allows particles of electrocatalyst to enter the matrix between individual macromolecules, and become adherent thereto, i.e., to become embedded to and bonded to the permionic membrane.

DETAILED DESCRIPTION OF THE INVENTION

Permionic membrane electrolytic chlor alkali cells have a permionic membrane dividing the anolyte compartment from the catholyte compartment. The electrolytic cell may either be a permionic membrane cell, i.e., with both the anode and the cathode spaced from the permionic membrane, or a zero gap permionic membrane cell, i.e., with the anode and the cathode both removably bearing upon the permionic membrane, that is, both removable therefrom without destruction of the permionic membrane, but with the substantial absence of an electrolyte film therebetween. Alternatively, the electrolytic cell may be a solid polymer electrolyte electrolytic cell wherein the anode electrocatalyst and cathode electrocatalyst are both bonded to and embedded in the permionic membrane, that is, the anode electrocatalyst and cathode electrocatalyst are only removable therefrom with degradation or destruction of either the permionic membrane or the anodic electrolyst or cathodic electrocatalyst. According to a still further exemplification, the permionic membrane electrolytic cell may be a hybrid electrolytic cell wherein one electrode is of one configuration, i.e., either permionic membrane configuration or zero gap configuration, or solid polymer configuration, and the opposite electrode is of a different configuration.

Where one surface is of either zero gap configuration, i.e., with electrocatalysts removably in contact therewith, it is advantageous to provide electroconductive current distributor particles therein whereby to provide for uniform current distribution across the surface of the permionic membrane, as described in the commonly assigned copending application Ser. No. 207,580 of DuBois, Ellsworth, and White for Permionic Membrane Electrolyte Cell Current Distributor Means, filed of even date herewith. Similarly, in a permionic membrane electrolyte cell having a solid polymer electrolyte configuration, the electrocatalyst is bonded to and embedded in the permionic membrane. In configurations where electroconductive material, i.e., either current distributor material or catalyst material, is bonded to and embedded in the permionic membrane, it has been found that the bonding and embedding is advantageously carried out through the use of a plasticizer. As herein contemplated, the plasticizer is present with the material to be bonded to and embedded in the permionic membrane, and the permionic membrane is subject to heat treatment, i.e., in a hot press, whereby to deposit the material therein.

According to a particularly preferred embodiment, the permionic membrane is itself in a thermoplastic form, as described, for example, in commonly assigned copending U.S. Application Ser. No. 120,247 of Preston S. White, for Solid Polymer Electrolyte and Method of Preparing Same, filed Feb. 11, 1980 now abandoned.

The plasticizers used herein may be pthalate plasticizers, i.e., monomeric pthalate plasticizers such as dialphanolpthalate, dibutylpthalate, dicaprylpthalate, dioctylpthalate, also equivalently referred to herein as di(2-ethyl hexyl)pthalate and as bis(2-ethyl hexyl)pthalate, diisooctylpthalate, dinonylpthalate, diisobutylpthalate, di(2-butoxyethyl)pthalate, also referred to equivalently as dibutylglycolpthalate, and diisodecylpthalate. Alternatively, the plasticizer may be a phosphate plasticizer, for example, a primary phosphate such as tritolyl phosphate, trixylenyl phosphate, or a secondary phosphate such as trialkyl phosphate, or trioctyl phosphate. According to a still further exemplification of this invention, the plasticizer may be a low temperature plasticizer such as a sebacate, an adipate, or an azelate. Exemplary thereof are dibutyl sebacate, dialphanolsebacate, diisooctyl sebacate, dioctyl sebacate, dibutyl adipate, dialkyl adipate, diisooctyl adipate, dioctyl adipate, didecyl adipate, di(n-octyl-n-decyl) adipate, diisoctyl azelate, and dioctyl azelate.

Especially preferred pthalates include bis(2-ethyl hexyl)pthalate, dibutylpthalate, and diisooctylpthalate. Particularly preferred phosphates include tritolyl phosphate and trixylyl phosphate. Particularly preferred long chain esters include dibutyl sebacate.

The pthalates that are particularly preferred as plasticizers are those having low temperature resistance, low vapor pressure, and compatibility with the resins herein contemplated, as fluorocarbon resins having pendant sulfonyl fluoride or sulfonyl chloride groups, or pendant carboxylic acid groups or carboxylic acid ester groups. By favorable compatibility properties are meant that the viscosity is such as to be capable of holding and immobilizing particles, i.e., metal or metal compound particles of particle sizes from about 0.1 micron to about minus 200 mesh, during hot pressing at temperatures from about 150 to about 300 degrees Centigrade, without flowing off of the permionic membrane during hot pressing, but rather penetrating into the permionic membrane as a plasticizer.

Especially preferred are those pthalates that are liquids in temperature of hot pressing herein contemplated, and are essentially non-volatile at the temperature of hot pressing.

The plasticizers herein contemplated are characterized by compatibility with the permionic membrane materials herein contemplated.

The permionic membrane interposed between the anolyte and the catholyte is fabricated of a polymeric fluorocarbon copolymer having immobile, cation selective ion exchange groups on a halocarbon backbone. The membrane may be from about 2 to about 25 mils thick, although thicker or thinner permionic membranes may be utilized. The permionic membrane may be a laminate of two or more membrane sheets. It may, additionally, have internal reinforcing fibers.

The permionic membrane may be a copolymer of (I) a fluorovinyl polyether having pendant ion exchange groups and having the formula:

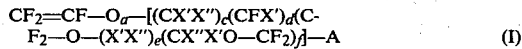  (I)

where a is 0 or 1, b is 0 to 6, c is 0 to 6, d is 0 to 6, e is 0 to 6, f is 0 to 6; X, X', and X" are —H, —Cl, —F, and —$(CF_2)_g CF_3$: g is 1 to 5, [ ] is a discretionary arrangement of the moieties therein: and A is the pendant ion exchange group as will be described hereinbelow. Preferably a is 1, and X, X' and X" are —F and $(CF_2)_g CF_3$.

The fluorovinyl polyether may be copolymerized with a (II) fluorovinyl compound:

  (II)

and a (III) perfluorinated olefin:

  (III)

or (I) may be copolymerized with only a (III) perfluorinated olefin, or (I) may be copolymerized with only a (II) perfluorovinyl compound.

The ion exchange group is a cation selective group. It may be a sulfonic group, a phosphoric group, a phosphonic group, a carboxylic group, a precursor thereof, or a reaction product thereof, e.g., an ester thereof. Carboxylic groups, precursors thereof, and reactions products thereof are preferred. Thus, as herein contemplated, A is preferably chosen from the group consisting of:

—COOH,
—COOR$_1$,
—COOM,
—COF,
—COCl,
—CN,
—CONR$_2$R$_3$,
—SO$_3$H,
—SO$_3$M,
—SO$_2$F, and
—SO$_2$Cl

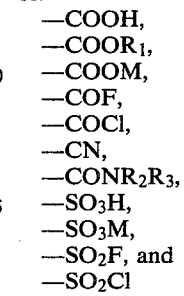

where R$_1$ is a C$_1$ to C$_{10}$ alkyl group, R$_2$ and R$_3$ are hydrogen or C$_1$ to C$_{10}$ alkyl groups, and M is an alkali metal or a quaternary ammonium group. According to a particularly preferred exemplification, A is —COCl,
—COOH,
—COOR$_1$,
—SO$_2$F, or
—SO$_2$Cl

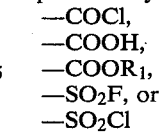

where R$_1$ is a C$_1$ to C$_5$, alkyl.

As herein contemplated, the permionic membrane is preferably a copolymer which may have:
(I) fluorovinyl ether acid moieties derived from:

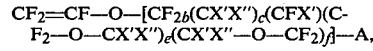

exemplified by:

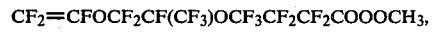

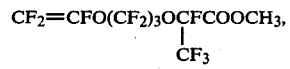

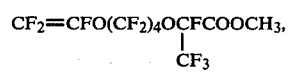

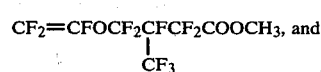 and

-continued $CF_2=CFOCF_2CF(CF_3)OCF(COOCH_3CH_3)$, inter alia;

(II) fluorovinyl moieties derived from:

$CF_2=CF-(O)_a-(CFX')_d-A$, exemplified by:

$CF_2-CF(CF_2)_{2-4}COOCH_3$, $CF_2-CF(CF_2)_{2-4}COOCH_3$, $CF_2=CFO(CF_2)_{2-4}COOCH_3$, $CF_2=CFO(CF_2)_{2-4}COOC_2H_5$, and $CF_2=CFO(CF_2)_{2-4}COOCH_3$, inter alia;

(III) fluorinated olefin moieties derived from:

$CF_2=CXX'$ as exemplified by tetrafluoroethylene, trichlorofluoroethylene, hexafluoropropylene, trifluoroethylene, vinylidene, fluoride, and the like: and (IV) vinyl ethers derived from:

$CF_2,=CFOR_4$.

The permionic membrane herein contemplated has an ion exchange capacity of from about 0.5 to about 2.0 milliequivalents per gram of dry polymer, preferably from about 0.9 to about 1.8 milliequivalents per gram of dry polymer, and in a particularly preferred exemplification, from about 1.0 to about 1.6 milliequivalents per gram of dry polymer. The permionic membrane herein contemplated has a volumetric flow rate of 100 cubic millimeters per second at a temperature of 150 to 300 degrees Centigrade, and preferably at a temperature between 160 to 250 degrees Centigrade. The glass transition temperature of the permionic membrane polymer is below 70° C., and preferably below about 50° C.

The permionic membrane herein contemplated may be prepared by the methods described in U.S. Pat. No. 4,126,588, the disclosure of which is incorporated herein by reference.

Most commonly the resins will be in a thermoplastic form, i.e., a carboxylic acid ester, e.g., a carboxylic acid ester of methyl, ethyl, propyl, isopropyl, or butyl alcohol, or a sulfonyl halide, e.g., sulfonyl chloride or sulfonyl fluoride, during the fabrication herein contemplated, and will thereafter be hydrolyzed.

Hot pressing is preferably carried out at a temperature of from 150 degrees Centigrade to about 270 or 300 degrees Centigrade, and in a particularly preferred case from about 180 to 220 degrees Centigrade. The pressures utilized are generally on the order of about 100 to 25,000 pounds per square inch, and a particularly preferred embodiment from about 150 to about 2500 pounds per square inch whereby to obtain adhesion of the particles, i.e., the conductor particles or the electrocatalyst particles to the permionic membrane.

Generally the time for hot pressing is from about 2 minutes to about 10 minutes, although longer or shorter times may be necessary depending upon the glass transition and softening temperature temperatures of the underlying polymer.

The method of this invention may be used with various particles, for example, conductor particles of silver, gold, or copper, or electrocatalyst particles of platinum black, nickel, Raney nickel, or the like.

According to one particularly preferred exemplification of the method of this invention, a permionic membrane composed of a fluorocarbon copolymer having pendant carboxylic acid ester groups is converted to a hybrid permionic membrane by depositing platinum black on one surface thereof. As herein contemplated, platinum black particles of a size range of about 1 micron and bis(2-ethyl hexyl) pthalate are placed on one surface of the permionic membrane. Thereafter, the permionic membrane is placed in a hot press and pressed at a temperature of about 200° Centigrade and a pressure of about 2000 pounds per square inch for about 2 to 10 minutes. Thereafter the permionic membrane is removed, and is seen to have platinum black particles adherent thereto, and deposited and embedded therein.

The following examples are illustrative:

EXAMPLE I

A permionic membrane electrolytic cell was assembled having a ruthenium dioxide coated anode bearing upon the anodic side of the permionic membrane, and platinum black and silver oxide, $Ag_2O$, bonded to the cathodic side of the permionic membrane.

An eleven mil thick by 5 inch by 5 inch Asahi Glass Co., Ltd. FLEMION ® HB permionic membrane fabricated of a perfluorocarbon copolymer having pendant carboxylic acid ester groups was coated with bis(2 ethyl hexyl) isopthalate plasticizer to which was added 0.2 grams of minus 325 mesh platinum black and 0.8 grams of minus 325 mesh silver oxide, $Ag_2O$, providing 3.4 milligrams per square centimeter of platinum and 12.8 grams per square centimeter of silver oxide. The coated permionic membrane was hot pressed at 200 degrees Centigrade and 20 tons force for 5 minutes.

Thereafter the electrolytic cell was assembled, with a ruthenium dioxide coated 40 mesh to the inch by 40 mesh to the inch, 3 inch by 3 inch, titanium anode pressed against the anodic surface of the permionic membrane by a 2.5 mesh to the inch by 5 mesh to the inch, 3 inch by 3 inch, ruthenium dioxide coated titanium screen. The cathode current collector was a 2.5 mesh to the inch by 5 mesh to the inch, 3 inch by 3 inch, nickel screen.

After 14 days of electrolysis the cell voltage sas 3.36 volts at 400 Amperes per square foot with 86 percent cathode current efficiency.

EXAMPLE II

A permionic membrane electrolytic cell was assembled having a ruthenijm dioxide coated titanium screen bearing upon the anodic surface of the permionic membrane and a bilayer of silver oxide, $Ag_2O$, and platinum black deposited on the cathode surface of the permionic membrane.

An eleven mil thick by 5 inch by 5 inch Asahi Glass Co., Ltd. FLEMION ® HB permionic membrane formed of perfluorocarbon copolymer having pendant carboxylic acid ester groups was coated with bis(2 ethyl hexyl) isophthlate plasticizer. Silver oxide particles, 1 micron in diameter, was applied atop the plasticizer to provide a silver oxide loading of 12 milligrams per square centimeter. Atop the silver oxide minus 325 mesh platinum black was applied to provide a platinum loading of 3.4 milligrams per square centimeter. The coated permionic membrane was hot pressed at 200 degrees Centigrade and 20 tons force for 5 minutes.

Thereafter the electrolytic cell was assembled, with a ruthenium dioxide coated, 40 mesh to the inch by 40 mesh to the inch, 3 inch by 3 inch titanium anode pressed against the anodic surface of the permionic membrane by a ruthenium dioxide coated, 2.5 mesh to the inch by 5 mesh to the inch, 3 inch by 3 inch titanium screen.

After 31 days of electrolysis the cell voltage was 3.86 volts at 396 Amperes per square foot and the cathode current efficiency was 87 percent.

EXAMPLE III

A permionic membrane electrolytic cell was assembled having a ruthenium dioxide coated titanium anode screen bearing upon the anodic surface of the permionic membrane, and a platinum coated nickel cathode bearing upon the silver oxide coated, cathodic surface of the permionic membrane.

An 11 mil thick by 5 inch by 5 inch Asahi Glass Co., Ltd. FLEMION ® type HB permionic membrane fabricated of a perfluorocarbon copolymer having pendant carboxylid acid ester groups was coated with bis(2-ethyl hexyl) isophthlate plasticizer. To this membrane was added 0.8 grams of 1 micron silver oxide, $Ag_2O$. The membrane was then hot pressed at 200 degrees Centigrade and 20 tons force for 5 minutes.

The cathode was prepared by electrophoretically depositing 1 micron platinum black onto a 20 mesh to the inch by 30 mesh to the inch, 3 inch by 3 inch, 0.005 inch thick expanded mesh nickel screen. The electrolytic cell was assembled with a ruthenium dioxide coated, 40 mesh to the inch by the 40 mesh to the inch, 3 inch by 3 inch titanium screen anode bearing against the anodic surface of the permionic membrane, and the platinum black coated nickel screen bearing against the silver oxide coated cathodic surface of the permionic membrane.

After 22 days of electrolysis the cell voltage was 3.41 volts at 396 Amperes per square foot, and the cathode current efficiency was 83.7 percent.

EXAMPLE IV

A permionic membrane electrolytic cell was assembled having a ruthenium dioxide coated titanium anode screen bearing against the anodic surface of the permionic membrane and a nickel screen cathode bearing against the silver oxide coated, cathodic surface of the permionic membrane.

An 11 mil thick by 5 inch by 5 inch Asahi Glass Co., Ltd. FLEMION ® type HB permionic membrane fabricated of a perfluorocarbon copolymer having pendant carboxylic acid ester groups was coated with bis(2-ethyl hexyl) isophthalate plasticizer. To this membrane was added 0.8 grams of 1 micron silver oxide, $Ag_2O$, powder. The membrane was then hot pressed at 200 degrees Centigrade and 20 tons force for 5 minutes.

The cathode was an uncoated, 40 mesh to the inch by 40 mesh to the inch, 3 inch by 3 inch, 0.005 inch thick nickel screen. The electrolytic cell was assembled with a ruthenium dioxide coated, 20 mesh to the inch, 3 inch by 3 inch, titanium screen anode against the anodic surface of the permionic membrane, and the nickel cathode pressed against the silver oxide coated, cathodic surface of the permionic membrane.

After 29 days of electrolysis the cell voltage was 3.31 volts at 396 Amperes per square foot, and the cathode current efficiency was 87.1 percent.

EXAMPLE V

A permionic membrane electrolytic cell was prepared by depositing cathodic electrocatalyst into the cathodic side of the permionic membrane by utilizing a plasticizer in conjunction with the electrocatalyst prior to hot pressing the cathodic electrocatalyst into the permionic membrane.

An 11 mil thick by 5 inch by 5 inch Asahi Glass Company, Ltd. FLEMION ® type HB permionic membrane fabricated of a perfluorocarbon copolymer having pendant carboxylic acid ester groups was coated with bis(2-ethyl hexyl isopthalate plasticizer. To the plasticizer coated surface of the permionic membrane was added 0.8 gram of minus 325 mesh platinum black. The platinum black was added by air brushing.

Thereafter the permionic membrane was hot pressed at 200 degrees Centigrade and 20 tons force for 5 minutes. The cell was then assembled by pressing a 40 mesh to the inch by 40 mesh to the inch, 3 inch by 3 inch, ruthenium dioxide coated titanium mesh screen against the anodic surface of the permionic membrane, and a 20 mesh to the inch by 30 mesh to the inch, 3 inch by 3 inch, cathode current collector against the platinum black coated, cathodic surface of the permionic membrane.

After 31 days of electrolysis the cell voltage was 3.86 volts at 396 Amperes per square foot, and the cathode current efficiency was 87.0 percent.

EXAMPLE VI

A permionic membrane electrolytic cell was prepared by depositing cathodic electrocatalyst into the cathodic surface of the permionic membrane utilizing a plasticizer in conjunction with particulate cathodic electrocatalyst.

An 11 mil thick by 3 inch by 3 inch Asahi Glass Company Co., Ltd. FLEMION ® type H permionic membrane fabricated of a perfluorocarbon copolymer having pendant carboxylic acid ester groups was coated with bis(2-ethyl hexyl) isophthlate plasticizer. To the plasticizer coated surface of the permionic membrane was air brushed 0.4 grams of platinum black. The membrane was then hot pressed at 200 degrees Centigrade and 20 tons force for 5 minutes to adhere the catalyst to the membrane.

The cell was then assembled by pressing a 40 mesh to the inch by 40 mesh to the inch, 3 inch by 3 inch ruthenium dioxide coated titanium mesh screen against the anodic surface of the permionic membrane, and 20 mesh to the inch by 30 mesh to the inch, 3 inch by 3 inch cathode current collector against the platinum black coated, cathodic surface of the permionic membrane.

After 13 days of electrolysis the cell voltage was 3.79 volts at 396 Ampers per square foot, and the cathode current efficiency was 75.2 percent.

While the invention has been described with respect to certain preferred exemplifications and embodiments, the scope of protection is not intended to be limited thereby, but only by the claims appended hereto.

We claim:

1. In a method of preparing an electrolyte impermeable chlor-alkali cell permionic membrane comprised of a fluorocarbon copolymer having immobile cation selective groups on a fluorocarbon backbone, comprising depositing electroconductive materials chosen from the group consisting of particles of metals, particles of metal compounds, and mixtures thereof on a surface of the permionic membrane, the improvement comprising providing a composition of plasticizer chosen from the group consisting of phthalates, sebacates, adipates, and azelates, and the particles of the electroconductive material on the surface of the permionic membrane, and hot pressing the plasticizer, the particles of electroconductive material, and the permionic membrane, whereby to deposit the electroconductive material in the permionic membrane.

2. The method of claim 1 wherein the plasticizer is substantially non-volatile during hot pressing.

3. The method of claim 1 wherein the plasticizer is capable of substantially immobilizing the electroconductive material during hot pressing.

4. The method of claim 1 wherein the plasticizer is hydrolyzed upon hydrolysis of the permionic membrane.

5. The method of claim 1 wherein the plasticizer is a phthalate plasticizer chosen from the group consisting of bis(2-ethyl hexyl) phthalate, dibutyl phthalate, and diisooctyl phthalate.

6. The method of claim 1 wherein the permionic membrane is in thermoplastic form while being hot pressed.

7. The method of claim 1 wherein the permionic membrane comprises a fluorocarbon copolymer having carboxylic acid groups.

8. The method of claim 7 wherein the permionic membrane is in the alkyl ester form while being hot pressed.

9. The method of claim 1 wherein the electroconductive material is electrocatalytic.

10. The method of claim 1 wherein the electroconductive material is a substantially non-electrocatalytic, current distributor.

* * * * *